Figure 1:
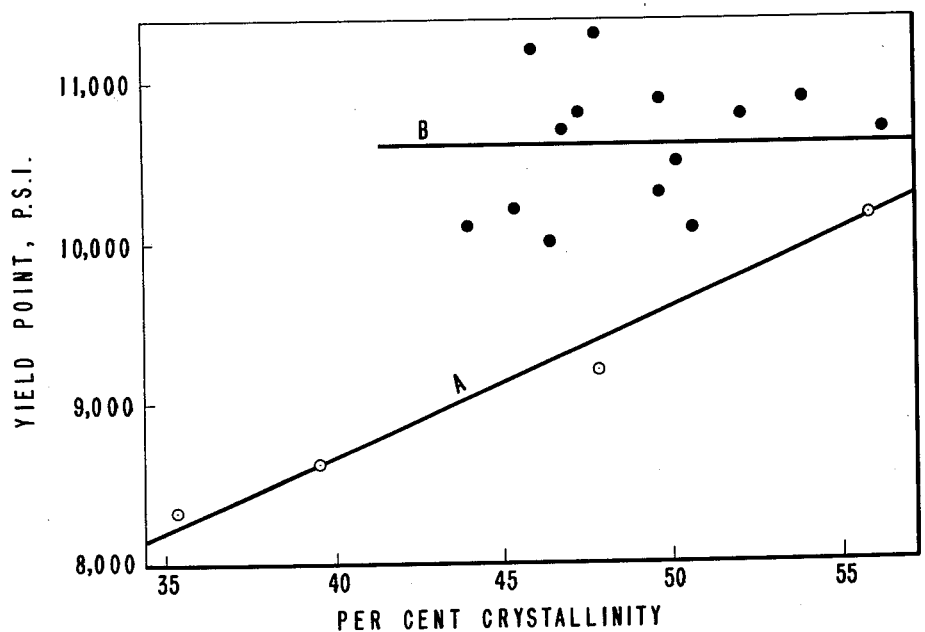

A. ○ NO VISIBLE SPHERULITES
B. ● VISIBLE SPHERULITES (30-65 μ DIAMETER)

45-52% CRYSTALLINE
- N = NUMBER OF SPHERULITE BOUNDARIES/MM
- ○ SAMPLES COMPRESSION-MOLDED.
- ● SAMPLES INJECTION MOLDED.
- △ SAMPLES CONTAINING NUCLEATING AGENTS, INJECTION-MOLDED.
- --- EXTRAPOLATED PORTION OF CURVE.

INVENTORS
RICHARD ENSIGN BROOKS
JAMES FRANKLIN COGDELL, JR.
CHESTER KARL ROSENBAUM
BY
ATTORNEY 3,080,345
PROCESS FOR FABRICATION OF SHAPED ARTICLES FROM LINEAR SUPERPOLYCARBONAMIDES TO PROVIDE IMPROVED PRODUCTS
Richard Ensign Brooks, James Franklin Cogdell, Jr., and Chester Karl Rosenbaum, Wilmington, Del., assignors to E. I. du Pont de Nemours and Company, Wilmington, Del., a corporation of Delaware
Filed Feb. 6, 1958, Ser. No. 713,583
8 Claims. (Cl. 260—78)

This invention relates to linear superpolycarbonamide resins, commonly called nylons, in the form of shaped articles characterized by improved physical properties resulting from a novel fine-structure in the nylon resin and to a process for fabrication of articles having improved physical properties from said linear superpolyamide resins. More particularly, this invention relates to shaped articles having a minimum cross-sectional dimension of 10 mils and fabricated from linear supercarbonamides containing added nucleating agents, said products being characterized by a uniform, fine spherulitic texture containing no non-spherulitic interstices within the body of the article. This application is a continuation-in-part of our copending application Serial Number 537,041 filed September 27, 1955, now abandoned.

Linear superpolycarbonamide resins, commonly referred to as nylons, have been known for a number of years and have been disclosed in many patents, including U.S. Patents 2,071,250 issued February 16, 1937; 2,071,251 issued February 16, 1937; 2,071,253 issued February 16, 1937; and 2,130,948 issued September 20, 1938, all to Wallace Hume Carothers. The linear superpolyamides with which this invention is concerned include the polymers made by the intermolecular condensation of linear diamines containing from 6 to 10 carbon atoms, which may be represented by the formula $H_2N—(CH_2)_x—NH_2$, where $x$ is an integer between 6 and 10, with the linear dicarboxylic acids containing from 2 to 10 carbon atoms, which may be represented by the formula $HO_2C—(CH_2)_y—CO_2H$, where $y$ is zero or an integer between 1 and 8; equally well, these superpolyamides may be made from amide-forming derivatives of these monomers such as esters, acid chlorides, amine salts, etc. This invention is likewise concerned with the polymers made by the intramolecular polymerization of omega-aminoacids containing 4 to 12 carbon atoms, which may be represented by the empirical formula $H_2N—(CH_2)_z—CO_2H$ where $z$ is an integer between 3 and 11, and their amide-forming derivatives, particularly the internal lactams,

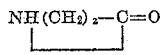

and amino-esters.

All of the linear superpolyamides with which this invention is concerned are semi-crystalline polymers. That is, in the solid state, these polymers are made up of a mixture of ordered regions, called crystallites, where portions of neighboring molecular chains are regularly aligned and close-packed as in monomeric crystalline materials, with disordered regions, called amorphous regions, where there is no regular alignment of neighboring molecular chains. Individual molecular chains may pass through several crystalline and amorphous regions. Thus individual crystallites are far too small to be seen under the microscope. However, another characteristic of these linear superpolyamides is a tendency to develop spherulites on cooling slowly from the melt. These spherulites are composite structures made up of crystalline and amorphous regions in which the crystallites are arranged in an essentially radial fashion with respect to a center or nucleus of growth. This characteristic arrangement results in an extinction pattern in the shape of a Maltese cross when a thin section is viewed by transmitted light between polarizing elements under the microscope.

As ordinarily fabricated, a linear superpolyamide resin will have a crystallinity between 20% and 60%, depending on the particular resin, the rate of cooling, and extent of annealing; it will contain also spherulites of varying size from the order of $10\mu$ to $60\mu$, and even larger, in diameter.

Many partially crystalline samples of nylon resin have a milky appearance. The absence of this milkiness has sometimes been cited as evidence of a completely amorphous structure; this is erroneous, since the crystallites in nylon are too small to scatter visible light. The observed milkiness is due to the presence of spherulites. This optical clarity does not necessarily mean that a specimen is entirely amorphous, but only that it contains no spherulites large enough to scatter light or be seen with a microscope. One object of this invention is to provide a process whereby it is possible to obtain uniform optical properties in fabricated nylon articles by control of spherulitic texture.

It has been discovered, as disclosed hereinbelow, that, to a significant extent, percent crystallinity and spherulitic texture can be varied independently in nylons. It is one object of this invention to provide linear superpolyamide resins in the form of fabricated shaped articles having a minimum cross-sectional dimension of 10 mils which are novel in that they are characterized by a uniform fine structure. Still another object of this invention is to provide shaped nylon articles having, when dry, exceptionally high stiffness and tensile yield strength, greater hardness, and improved, uniform optical properties. It is a further object of this invention to describe a process for obtaining the aforesaid products having a uniform fine structure containing no non-spherulitic interstices within the body of the article. Other objects and advantages of this invention will appear hereinafter.

It has now been discovered as hereinbelow disclosed that the objects of this invention can be achieved by providing a linear superpolyamide in the form of a shaped article having a minimum cross-sectional dimension of 10 mils and characterized by a uniform spherulitic texture containing no non-spherulitic interstices within the body of the article and exhibiting a crystallinity between 20% and 60%, the crystallites being grouped together with amorphous regions into sperulites having a diameter less than $10\mu$.

This invention provides a process for fabrication of shaped articles having a minimum cross-sectional dimension of 10 mils from linear superpolyamides which comprises heating the linear superpolyamide to from about 1° C. to about 100° C. above its crystalline melting point in the presence of from 0.005% to 5% by weight of a nucleating agent from the group consisting of finely-divided powders having a maximum particle dimension of less than $1\mu$ (micron) and characterized by existing in a solid state in the polyamide at temperatures near the melting point of the aforesaid linear polyamide, and by having active polar surfaces which adsorb amide groups at a temperature between the melting point of the superpolyamide resin and about 30° C. below said melting point, shaping the molten polyamide by means of a forming device, and solidifying the shaped article by cooling to from 20° C. below the crystalline melting point of the resin to room temperature whereby a shaped solid article is obtained having a minimum cross-sectional dimension of 10 mils and which is characterized by a uniform spherulitic texture containing no nonspherulitic interstices within the body of the article, and exhibiting a crystallinity between about 20% and about 60%, the crystallites being grouped together with amorphous regions into spherulites having diameters less than 10μ. While the uniform spherulitic texture free from non-spherulitic interstices extends through the body of the shaped nylon articles, it has been found that under some molding and extrusion conditions, an extremely thin film of quenched, non-spherulitic nylon forms on the surface of the shaped nylon articles without having an appreciable effect upon the gross physical properties of the articles.

FIGURE 1 shows graphically the relationship between crystallinity, spherulitic content, and yield point strength of polyhexamethylene adipamide and is used to illustrate Example 4.

Figure 2:
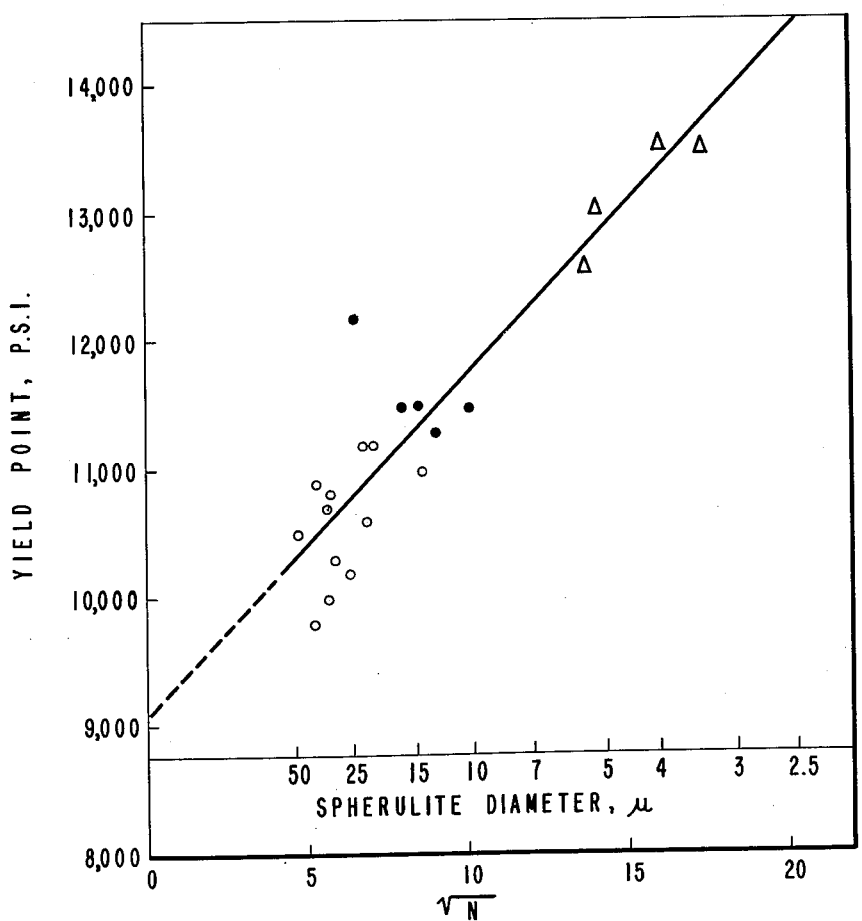

FIGURE 2 hows graphically the relationship between spherulite diameter and yield stress of polyhexamethyleneadipamide and is used to illustrate Example 5.

In carrying out the process of this invention, the nucleating agent may be added to the nylon resin at any convenient time prior to the solidification of the shaped article. Thus, for example, the nucleating agent may be distributed over the surfaces of nylon molding granules prior to feeding the granules to an extruder or to an injection molding apparatus or other forming device. This distribution of the nucleating particles may be accomplished by adding the solid powder to the nylon granules and tumbling. Equally well, the powder, in suspension in a low-boiling liquid, such as a petroleum ether or an alcohol, may be sprayed over the surfaces of the nylon granules and the solvent evaporated. If desired, a small amount of a binding agent may be incorporated into the low-boiling solvent or added with the powdered nucleating agent to prevent dusting and to bind the powder to the nylon granule surfaces. Particularly suitable binding agents are the silicone oils described in a copending application, S.N. 649,312 filed on March 29, 1957 by Philip D. Brossman and Edward H. Price. Another method of adding the nucleating agent is to mix the powder with the molten nylon resin prior to preparation of the molding granules; in some cases, the nucleating agent may be added during or prior to the polymerization of the linear superpolyamide. Equally well the nucleating agent may be added to a solution of the polyamide in a polar solvent at elevated temperature and the polymer then precipitated by cooling. Still another method of introducing finely-divided nucleating agents is to add a nucleating agent which dissolves in the molten polyamide above its melting point and then precipitates out in an extremely fine dispersion at a temperature not lower than 30° C. below the crystalline melting point of the polyamide, thus providing solid, polar surfaces which adsorb amide groups of the polyamide chains and provide a very large number of nucleating sites for spherulitic growth.

The nucleating agents with which this invention is concerned cannot be classified chemically since their activity is not chemical in the traditional sense, which involves molecular reactivity and the formation of new chemical compounds. Rather, the nucleating agents with which this invention is concerned belong to a physical class, since their effect is primarily a physical, rather than a chemical, phenomenon. The physical function performed by a nucleating agent is to provide a large number of sites for the growth of spherulites in the temperature range from 0° to 40° C. below the crystalline melting point of the nylon resin. As hereinabove described, spherulites are composite structures, made up of both crystalline and amorphous regions, in which there is a radial arrangement of the crystallites around a center of growth. Spherulitic content should not be confused with the crystallinity. To a large extent these two phenomena can be varied independently. It is possible, by rapidly quenching thin films to room temperature and then annealing at 100° C., to have a highly crystalline, transparent linear superpolyamide containing no spherulites. On the other hand, it is possible by molding thin films containing a few spherulitic nuclei to produce linear superpolyamides having a low crystallinity but having considerable opacity due to the presence of large spherulites. The crystalline content of these spherulites may be varied independently of the number and size of the spherulites, as by annealing treatments after the original solidification of the nylon. Annealing below the melting point $d$ does not change the spherulitic texture of the solid nylon but merely increases the crystalline content. However, this invention is not concerned with such thin films but rather with shaped articles having relatively gross cross-section; i.e., greater than 10 mils.

It has been discovered that any sufficiently finely divided material having a maximum dimension less than 1μ, which is solid at from the melting temperature of the nylon to about 35° C. below this temperature, which tends to disperse rather than agglomerate in molten nylon, and which provides polar surfaces which adsorb, and hence orient, some of the amide groups of the polyamide chains, will provide the nucleation sites required for the initiation of spherulitic growth during the solidification of nylons having a minimum cross-sectional dimension of 10 mils. Thus inorganic salts and metal oxides which adsorb amide groups at elevated temperatures show nucleation activity, if sufficiently finely divided and not agglomerated. The presence of a stable organic substituent such as a hydrocarbon group in an inorganic salt tends to improve the affinity of the salt for the molten nylon and hence prevents agglomeration and improves the dispersion of the finely-divided solid salt. Thus finely-divided sodium phenylphosphinate or sodium isobutylphosphinate are preferred nucleating agents; other excellent and preferred nucleating agents include such materials as finely-divided silver halides, alkaline earth oxides, and some very fine silicas and aluminas. Compounds which actually dissolve in hot, molten nylons at temperatures above their melting points, but which precipitate out in an extremely fine state near the melting point of the polyamide are likewise effective nucleating agents. Such materials include mercuric halides, divalent metal acetates, and high molecular weight, aromatic, polar compounds such as phenolphthalein.

The process of this invention provides superior shaped articles having a minimum cross-sectional dimension of 10 mils and formed by a means for shaping nylon resins by the use of conventional equipment such as extruders, injection and compression molding apparatus, and calenders into useful articles such as sheets, ribbons, tubes, rods, wire-covering, household articles, hardware fixtures, automotive parts, etc., having the superior physical properties which result from the unique, uniform spherulitic texture of the novel products of this invention. When dry, the novel products of this invention exhibit exceptional stiffness and yield stress, generally from 10% to 20% greater than products made from the same polyamides without benefit of added nucleating agents. These products are freer from internal stresses so that when in equilibrium with moisture, they provide better performance in use since they are harder, tougher and do not warp or crack due to internal stresses.

The following examples are intended to illustrate the invention and to show quantitatively the effects of nucleation on the properties of shaped nylon articles having a minimum cross-sectional dimension of 10 mils; they are not intended to limit in any way the subject invention as set forth hereinabove.

EXAMPLE 1

A polyhexamethylene adipamide nylon resin having a number average molecular weight of about 17,000 (intrinsic viscosity of 1.2 dl./g. in meta-cresol solvent) was employed for the injection-molding of test speciments using a commercial 1 oz. machine. The molding conditions are given in Table I.

TABLE I
*Molding Conditions*

| | |
|---|---|
| Cylinder temperature _____deg__ | 275 |
| Mold temperature _____deg__ | 45 |
| Cylinder pressure _____p.s.i__ | 11,200 |
| Cycle _____ | [1] 30/30 |

[1] Open 30 sec./closed 30 sec.

The polymer was divided into two batches. One was used as control without an additive; to the other there was added 0.25% by weight of sodium phenylphosphinate, a nucleating agent as hereinabove defined. Specimens for the tensile stress-strain test (ASTM Method D–638) and the flexural modulus test (ASTM Method D–790) were annealed in "Glycowax" S–932 at 175° C. for 30 minutes to reduce any molded-in stresses and point-to-point variations in crystallinity, particularly at the surfaces. It was observed that this treatment did not alter the spherulitic texture of the test specimens. Test specimens molded from the control contained large spherulites, principally of 25–30μ diameter with nonspherulitic material between. The nucleated polymer gave molded specimens in which the spherulites had diameters of about 2μ. The results of the various physical tests on these two sets of specimens are given in Table II.

TABLE II
*Mechanical Properties of Dry Moldings of Spherulitic Size*

| Property | ASTM Method | Non-nucleated Spherulites 25–30μ diam. | | Nucleated Spherulites 2μ diam. | |
|---|---|---|---|---|---|
| | | 23° C. | 50° C. | 23° C. | 50° C. |
| Flexural Modulus, p.s.i. | D-790 | 418,000 | 235,000 | 458,000 | 250,000 |
| Upper Yield Stress, p.s.i. | D-638 | 11,800 | 9,300 | 13,700 | 10,500 |
| Lower Yield Stress, p.s.i. | D-638 | 8,100 | 7,200 | | 7,500 |
| Ultimate Strength, p.s.i. | D-638 | 8,100 | 7,400 | | 7,600 |
| Ultimate Elongation, Percent | D-638 | 60 | 190 | 25 | 125 |
| Rockwell Hardness | D-785 | M79 | | M88 | |
| Percent Crystallinity | | 48 | | 52 | |

The small difference in percent crystallinity could account for not more than 20% of the differences observed in stiffness and yield point.

In order to show conclusively that the effect of spherulitic texture on yield point was not due to the presence per se, of foreign particles, another portion of the same polyhexamethylene adipamide sample was mixed with 0.9% by weight of a commercial $TiO_2$ pigment which was not a powerful nucleating agent. Similar moldings of tensile specimens from this mixture gave products which did not have the fine spherulitic texture characteristic of the products of this invention; these specimens when dry had a yield stress of 12,100 p.s.i. compared with 13,700 p.s.i. for nucleated specimens containing only 0.25% by weight of a nucleating agent.

EXAMPLE 2

In this experiment, the effects of nucleating agents which crystallize from a molten nylon near its melting point on the spherulitic texture were determined. The procedure used for mixing the nucleating agent was to dissolve the nylon in methanol at 180° C. under autogenous pressure in the presence of 1% of the nucleating agent and then to reprecipitate the polymer. This provided a convenient laboratory method for obtaining an intimate mixture. The dried polymer fluffs were then compression-molded into thin sheets. Two types of nylon, polyhexamethylene adipamide and polyhexamethylene sebacamide, were employed. In the case of the polyhexamethylene adipamide, the moldings were made at 290° C., quenched to 240° C. and held ten minutes to anneal to relatively constant crystallinity, and then quenched in a Dry Ice and acetone bath. The lower melting polyhexamethylene sebacamide was molded at 250° C., quenched to 200° C. and held for ten minutes and then quenched in Dry Ice-acetone. Results are listed in Table III.

TABLE III

| Nucleating Agent | Polyhexamethylene Adipamide (66 Nylon) | | Polyhexamethylene Sebacamide (610 Nylon) | |
|---|---|---|---|---|
| | Percent Crystallinity | Max. Spherulitic Diameter, μ | Percent Crystallinity | Max. Spherulitic Diameter, μ |
| Control (no additive) | 50 | 13 | 42 | 30 |
| $HgBr_2$ | 49 | 2 | 40 | 10 |
| $HgCl_2$ | 43 | 3 | | 6 |
| $Cd(Acetate)_2$ | 46 | 2 | 32 | 10 |
| $Pb(Acetate)_2$ | 46 | 3 | | |
| Phenolphthalein | 46 | 3 | 46 | 2 |

EXAMPLE 3

In this experiment, the effects on the spherulitic texture of nylons of higher-melting, finely-divided nucleating agents which do not dissolve in the molten nylon were determined. Intimate mixtures were obtained, as in Example 2, by dissolving the nylon in methanol at 180° C. under autogeneous pressure, adding the powdered nucleating agent to the solution, and then reprecipitating the nylon. As in Example 2, both polyhexamethylene adipamide and polyhexamethylene sebacamide were employed. Thin sheets were molded and annealed under the conditions described in Example 2. The results are listed in Table IV.

TABLE IV

| Nucleating Agent | Particle * Dimensions | Polyhexamethylene Adipamide | | Polyhexamethylene Sebacamide | |
|---|---|---|---|---|---|
| | | Percent Crystallinity | Max. Spherulitic * Diameter, μ | Percent Crystallinity | Max. Spherulitic * Diameter, μ |
| Hydrated $Al_2O_3$, Alcoa C-730 | 1μ | 47 | 10 | 42 | 5 |
| γ $Al_2O_3$, "Alon" C, Cabot | 23mμ | 40 | 6 | 41 | 3 |
| $Al_2O_3$, Fibrous Boehmite | 5 mμ x 500 mμ | 47 | 8 | 37 | 6 |
| $SiO_2$ | 17 | 51 | 8 | 42 | 7 |
| MgO, "Seasorb" 43 | Plates, 5 mμ x 500 mμ. | 47 | 2 | 39 | 4 |
| Sodium Phenylphosphinate | | 54 | 5 | | |
| Controls (no additive) | | 51 | 13 | 42 | 30 |

* mμ is symbol for millimicrons, 1/1000 of a micron (μ).

EXAMPLE 4

The dependence of yield stress on the crystallinity of non-spherulitic polyhexamethylene adipamide nylons and the independence of yield stress from crystalline content of the same nylon when containing spherulites was demonstrated in a series of experiments from which the data summarized in FIGURE 1 were obtained. Non-spherulitic films were obtained by melt-pressing the nylon at 290° C. and quenching the molten films in a Dry Ice heptane bath, followed by annealing at temperatures between 100° C. and 250° C. to give varying degrees of crystallinity. As seen from the open circles defining curve A of FIGURE 1, there was a linear increase in yield stress with crystallinity in the absence of spherulites.

On the other hand, when the same nylon resin was molded into films at 290° C. and then hot quenched at temperatures between 50° C. and 225° C. for 15 minutes, large spherulites having diameters between $35\mu$ and $65\mu$, principally between 50 and $60\mu$, were formed. As seen from the solid circles defining curve B of FIGURE 1, the yield stress of these spherulitic nylon films were higher than for the non-spherulitic films, and the yield stress was independent of the percent crystallinity. Curve B represents an average since there was some scatter of the points due to varying spherulite size in these samples. However, none of these samples had the uniform fine spherulitic texture characteristic of the products of this invention.

EXAMPLE 5

The effect of spherulitic size on the yield stress of polyhexamethylene adipamide was determined in another series of experiments, the results of which are summarized in FIGURE 2 which shows a linear relationship between yield stress and the square root of the number of spherulitic boundaries per millimeter ($\sqrt{N}$). The spherulitic diameter corresponding to values of $\sqrt{N}$ are also shown in FIGURE 2; obviously, the larger the number of spherulite boundaries per millimeter, the smaller the spherulites. Data for nylon samples containing spherulites larger than $10\mu$ in diameter were obtained by hot quenching compression molded films (open circles of FIGURE 2) and injection moldings (solid circles of FIGURE 2) as described above. Data on samples containing spherulites smaller than $10\mu$, characteristic of the products of the invention, were obtained from injection moldings containing nucleating agents (triangles of FIGURE 2). All samples were annealed to a relatively constant, high crystallinity between 45% and 52%. Extrapolation of this curve to zero spherulite boundaries gives a yield point strength of about 9100 p.s.i., in good agreement with the value for 45% crystalline, non-spherulitic films shown by FIGURE 1, curve A.

Examples 4 and 5 demonstrate that spherulitic texture affects the physical properties of thin nylon films independently of the crystallite-amorphous ratio. This invention has provided shaped articles having a minimum cross-sectional dimension of 10 mils and having superior physical properties resulting from a novel spherulitic texture containing no non-spherulitic interstices within the body of the article and characterized by uniform spherulites having diameters less than $10\mu$. Furthermore, this invention provides a novel process for fabrication of shaped nylon articles having a minimum cross-sectional diameter of 10 mils whereby the aforesaid uniform spherulitic texture through the body of articles having a gross cross-section can be obtained reproducibly using conventional fabricating equipment.

We claim:

1. A shaped nylon article having a minimum cross-sectional dimension of at least 10 mils comprising a linear superpolycarbonamide containing from about 0.005% to 5% by weight of a finely-divided, solid nucleating agent selected from the group consisting of sodium phenylphosphinate, sodium isobutylphosphinate, magnesium oxide, mercuric bromide, mercuric chloride, cadmium acetate, lead acetate, and phenolphthalein, said nucleating agent being dispersed throughout the superpolycarbonamide in the form of particles having maximum dimensions of less than 1 micron, the aforesaid linear superpolycarbonamide being selected from the group consisting of the polycarbonamides made by the intermolecular polymerization of linear aliphatic diamines containing from 6 to 10 carbon atoms with linear aliphatic dicarboxylic acids containing from 2 to 10 carbon atoms and their amide-forming derivatives, and the polycarbonamides made by the intramolecular polymerization of omega-aminoacids containing from 4 to 12 carbon atoms and their amide-forming derivatives, said linear superpolycarbonamide being characterized by an intrinsic viscosity between 0.3 and 3.5 dl./g., determined in m-cresol, and a crystallinity of between 20% and 60%, and by having a uniform, spherulitic texture containing no non-spherulitic interstices within the body of the article, said spherulites having diameters of between about 0.5 and about 10 microns.

2. An article of claim 1 in which the linear superpolycarbonamide is polyhexamethylene adipamide and the nucleating agent is sodium phenylphosphinate.

3. An article of claim 1 in which the linear superpolycarbonamide is polycaprolactam and the nucleating agent is sodium phenylphosphinate.

4. An article of claim 1 in which the linear superpolycarbonamide is polyhexamethylenesebacamide and the nucleating agent is sodium phenylphosphinate.

5. A process for fabricating useful, shaped nylon articles having a minimum cross-sectional dimension of at least 10 mils from a linear superpolycarbonamide selected from the group consisting of the polycarbonamides made by the intermolecular polymerization of linear aliphatic diamines containing from 6 to 10 carbon atoms with linear aliphatic dicarboxylic acids containing from 2 to 10 carbon atoms and their amide-forming derivatives, and the polycarbonamides made by the intramolecular polymerization of omega-aminoacids containing from 4 to 12 carbon atoms and their amide-forming derivatives, said linear superpolycarbonamides being characterized by an intrinsic viscosity between 0.3 and 3.5 dl./g., measured in meta-cresol as solvent, which comprises heating the linear superpolycarbonamide to from about 1° C. to about 100° C. above its crystalline melting point in the presence of a nucleating agent dispersed throughout the polycarbonamide, said nucleating agent being selected from the group consisting of sodium phenylphosphinate, sodium isobutylphosphinate, magnesium oxide, mercuric bromide, mercuric chloride, cadmium acetate, lead acetate, and phenolphthalein, shaping the molten superpolycarbonamide by means of a forming device, and solidifying the shaped article by cooling to at least 30° C. below the crystalline melting point of the linear superpolycarbonamide, whereby a shaped, solid article is obtained which is characterized by the presence of the aforesaid nucleating agent dispersed throughout as finely-divided, solid particles having maximum dimensions of less than 1 micron, by a crystallinity between about 20% and about 60%, and by a uniform spherulitic texture containing no non-spherulitic interstices within the body of the article, said spherulites having diameters of between about 0.5 and about 10 microns.

6. A process according to claim 5 in which the linear superpolycarbonamide is polyhexamethylene adipamide and the nucleating agent is sodium phenylphosphinate.

7. A process according to claim 5 in which the linear superpolycarbonamide is polycaprolactam and the nucleating agent is sodium phenylphosphinate.

8. A process according to claim 5 in which the linear superpolycarbonamide is polyhexamethylene sebacamide and the nucleating agent is sodium phenylphosphinate.

(References on following page)

References Cited in the file of this patent

UNITED STATES PATENTS

| | | |
|---|---|---|
| 2,278,878 | Hoff | Apr. 7, 1942 |
| 2,510,777 | Gray | June 6, 1950 |
| 2,557,808 | Walker | June 19, 1951 |
| 2,705,227 | Stamatoff | Mar. 29, 1955 |
| 2,874,139 | Symons | Feb. 17, 1959 |
| 2,875,171 | Foster et al. | Feb. 24, 1959 |

OTHER REFERENCES

Langkammerer et al.: J. of Polymer Sci., vol. 3, No. 3 (1948), pp. 305–313.

Turnbull: J. Chem. Phys., vol. 18, pp. 198–203 (1950).

Buckley: "Crystal Growth," 1951, pp. 35–41, publ. by J. Wiley and Sons, Inc., New York.

Price: Journal of Am. Chem. Soc., vol. 74, 1952, pp. 311–318.

Keller: Nature, vol. 169, pp. 913–914 (1952).

Schuur: Journal of Polymer Science, vol. 11, No. 5, pp. 385–398 (1953).

Bryant et al.: Journal of Polymer Science, vol. 16, pp. 131–142 (1955).